United States Patent
Pankey

(10) Patent No.: US 9,359,955 B2
(45) Date of Patent: Jun. 7, 2016

(54) APPARATUS AND METHOD INCORPORATING A TRANSITION AFT SUPPORT FOR A GAS TURBINE ENGINE

(71) Applicant: Siemens Energy, Inc., Orlando, FL (US)

(72) Inventor: William W. Pankey, Palm Beach Gardens, FL (US)

(73) Assignee: Siemens Energy, Inc., Orlando, FL (US)

( * ) Notice: Subject to any disclaimer, the term of this patent is extended or adjusted under 35 U.S.C. 154(b) by 132 days.

(21) Appl. No.: 14/471,700

(22) Filed: Aug. 28, 2014

(65) Prior Publication Data

US 2016/0061450 A1    Mar. 3, 2016

(51) Int. Cl.
*F02C 7/20* (2006.01)
*F01D 9/02* (2006.01)
*F01D 25/28* (2006.01)

(52) U.S. Cl.
CPC . *F02C 7/20* (2013.01); *F01D 9/023* (2013.01); *F01D 25/28* (2013.01)

(58) Field of Classification Search
CPC .......... F02C 7/20; F02C 3/14; F05D 2260/30; F23R 3/60; F01D 9/023; F01D 25/28
See application file for complete search history.

(56) References Cited

U.S. PATENT DOCUMENTS

| | | | | |
|---|---|---|---|---|
| 5,761,898 A * | 6/1998 | Barnes | ...................... | F23R 3/60 60/39.37 |
| 2009/0145137 A1* | 6/2009 | Rizkalla | .................. | F01D 9/023 60/796 |
| 2009/0188258 A1* | 7/2009 | Rizkalla | .................. | F01D 9/023 60/800 |
| 2014/0260319 A1* | 9/2014 | Melton | ...................... | F23R 3/60 60/796 |

\* cited by examiner

*Primary Examiner* — Andrew Nguyen

(57) ABSTRACT

An apparatus for supporting an aft portion of a transition duct in a gas turbine engine includes a transition aft frame that engages with an annular shaped stator component disposed in a turbine section of the gas turbine engine. The transition aft frame includes radially inner and outer panels and circumferentially spaced first and second side panels connecting the inner and outer panels. A forward face of the stator component includes first and second connection points circumferentially spaced apart. The transition aft frame includes first and second attachment structures that respectively engage with the first and second connection points when the transition duct is aligned axially with the stator component. The first and second attachment structures are spaced apart in a manner effective to transfer moment load from the first and second attachment structures to the first and second side panels respectively.

16 Claims, 5 Drawing Sheets

APPARATUS AND METHOD INCORPORATING A TRANSITION AFT SUPPORT FOR A GAS TURBINE ENGINE

BACKGROUND

1. Field

Embodiments of the present invention relate generally to gas turbine engines, and in particular, to a method and apparatus for supporting an aft portion of a transition duct in a gas turbine engine.

2. Description of the Related Art

A conventional gas turbine engine includes a compressor section, a combustion section including a plurality of combustors, and a turbine section. Ambient air is compressed in the compressor section and conveyed to the combustors in the combustion section. The combustors combine the compressed air with a fuel and ignite the mixture creating combustion products defining hot working gases that flow in a turbulent manner and at a high velocity. The working gases are routed to the turbine section via a plurality of transition ducts. Within the turbine section are rows of stationary vane assemblies and rotating blade assemblies. The rotating blade assemblies are coupled to a turbine rotor. As the working gases expand through the turbine section, the working gases cause the blades assemblies, and therefore the turbine rotor, to rotate. The turbine rotor may be linked to an electric generator, wherein the rotation of the turbine rotor can be used to produce electricity in the generator.

The transition ducts are positioned adjacent to the combustors and route the working gases from the combustors into the turbine section through turbine inlet structure associated with a first row vane assembly. The vane assembly is mounted on an annular vane carrier. The transition duct comprises an aft frame defining a transition exit that opens into the gas turbine section.

A transition duct may be assembled on the aft side by fastening the transition aft frame to a stator component of the turbine section, such as the vane carrier. For this purpose, the forward face of the vane carrier contains axially extending threaded holes or holes comprising threaded inserts that align with a central radially outwardly extending bracket of the transition aft frame. The transition aft frame is then bolted to the vane carrier.

At the forward end, the transition duct is attached to one of the combustors by a forward mount. To accommodate differential thermal growth between the combustor and the transition duct, the forward mount is generally compliant to a translation motion along the axis of the transition duct. At the aft end, the transition aft frame is vertically constrained by the bolts. However, bending of the central bracket of the transition aft frame allows horizontal or axial (with respect to the vane carrier) motion of the transition duct at the aft end.

The relatively unconstrained horizontal motion of the large mass transition duct, coupled with a vertical constraint from the transition aft frame imposes bending on the outer diameter surface of the transition duct. This causes cracking of the transition duct at the midspan of the outer diameter surface of the aft end of the transition duct.

SUMMARY

Briefly, aspects of the present invention provide a method and apparatus for supporting an aft portion of a transition duct in a gas turbine engine.

In a first aspect an apparatus for supporting an aft portion of a transition duct in a gas turbine engine is provided. The apparatus comprises an annular shaped stator component disposed in a turbine section of the gas turbine engine, and a transition aft frame that engages with the stator component. The transition aft frame comprises a radially outer panel, a radially inner panel, and circumferentially spaced first and second side panels connecting the radially inner and radially outer panels. A forward face of the stator component comprises a first connection point and a second connection point spaced apart in a circumferential direction. The transition aft frame comprises first and second attachment structures that respectively engage with the first and second connection points on the forward face of the stator component when the transition duct is aligned axially with the stator component. The first and second attachment structures are spaced apart, the spacing being effective to transfer moment load from the first and second attachment structures to the first and second side panels respectively.

In a second aspect, a transition duct for a gas turbine engine is provided. The transition duct comprises a transition aft frame attachable to an annular shaped stator component of a turbine section of the gas turbine engine. The transition aft frame comprises a radially outer panel, a radially inner panel, and circumferentially spaced first and second side panels connecting the radially inner and radially outer panels. The transition aft frame comprises first and second attachment structures that are arranged circumferentially spaced apart. The first and second attachment structures are configured to align with corresponding connection points on a forward face of the stator component when the transition duct is assembled axially with the stator component. The spacing between the first and second attachment structures is effective to transfer moment load from the first and second attachment structures to the first and second side panels respectively.

In a third aspect, a method is provided for supporting an aft portion of a transition duct to a turbine section of a gas turbine engine. The method comprises engaging a transition aft frame with an annular shaped stator component disposed in a turbine section of the gas turbine engine. The transition aft frame comprises a radially outer panel, a radially inner panel, and circumferentially spaced first and second side panels connecting the radially inner and radially outer panels. The engagement comprises axially aligning the transition duct with the stator component, whereby a first and a second attachment structure of the transition aft end mates with a first and a second connection point on a forward face of the stator component respectively. The first and second attachment structures are spaced apart in a circumferential direction, the spacing being effective to transfer moment load from the first and second attachment structures to the first and second side panels respectively.

BRIEF DESCRIPTION OF THE DRAWINGS

The invention is shown in more detail by help of figures. The figures show preferred configurations and do not limit the scope of the invention.

DETAILED DESCRIPTION

Figure 1:
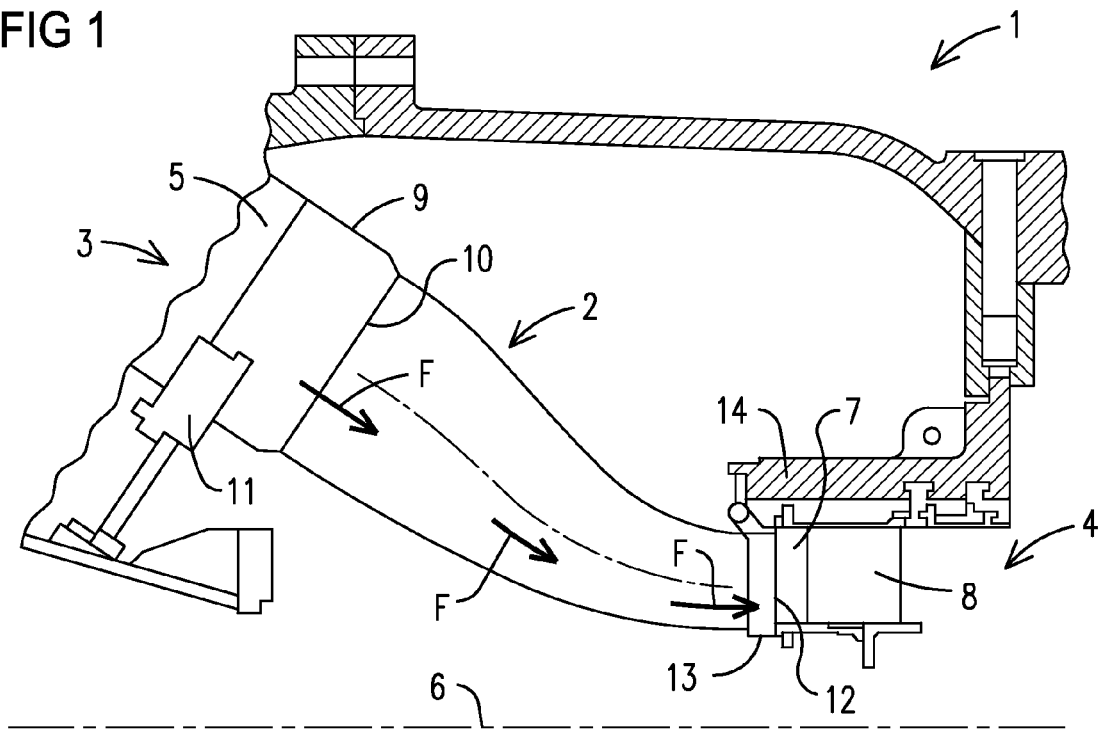
FIG. 1 illustrates a side elevation view of a portion of a gas turbine engine including a transition duct extending from a combustor to the entrance to a turbine section, in accordance with one embodiment.

Embodiments of the present invention illustrated herein provide a method and apparatus for supporting an aft portion of a transition duct in a gas turbine engine. The illustrated embodiments provide an inventive transition aft support that provides improved moment control with respect to rotation about the transition duct axis, while imparting reduced deflection of the outer diameter surface of the transition duct. Cracking of the outer diameter surface of the transition duct may be thereby avoided or minimized.

As used in this Specification, the terms "forward" and "aft" are defined in relation to the direction of flow of the working medium, wherein forward refers to a relative upstream position and aft refers to a relative downstream position. The flow direction is indicated by the reference sign F in the drawings.

Referring to FIG. 1, a portion of a gas turbine engine 1 is illustrated, including a transition duct 2 extending from a combustor section 3 to the entrance of a turbine section 4. The combustor section 3 may include, for example, a plurality of combustors 5 arranged in a circular arrangement about a turbine axis 6. Only one such combustor 5 is shown in FIG. 1. Each combustor 5 comprises a combustion zone wherein a working medium is produced by combustion of a mixture of fuel and an oxidant, such as compressed air from a compressor section (not shown) of the gas turbine engine 1. Each combustor 5 has a respective transition duct 2 attached thereto that provides a conduit for conveying the working medium comprising hot combustion gases from the combustor 5 to the entrance 7 of a turbine assembly, where the gases are directed toward a first row of stationary vanes 8 arranged on an annular shaped turbine vane carrier (TVC) 14. An inlet ring 9 may be provided at an inlet end 10 of the transition duct 2. The inlet ring 9 may have, for example, a generally circular cross-section. The inlet ring 9 may be supported by an inlet support 11. An outlet end 12 of the transition duct 2 may include a transition aft frame 13. In the illustrated example, the aft frame 13 has a generally rectangular or trapezoidal arc-like shape. The transition duct 2 in this example has a geometric profile that transitions from a generally circular cross-section, substantially corresponding to the shape of the outlet from the combustor 5, to a generally trapezoidal or rectangular arc-like cross-section at the turbine entrance 7, while also defining a radially inwardly extending path for the gas flow. The transition duct 2 is attached to the turbine section 4 by fastening the transition aft frame 13 to a stator (i.e., stationary) component of the turbine section 4. In the illustrated embodiment, the transition aft frame 13 is fastened to the TVC 14. In an alternate embodiment, the transition aft frame 13 may be fastened to another stator component, such as a casing. The transition aft frame 13 may be cast together with the transition duct 2, or may be manufactured separately and welded to the transition duct at the outlet end.

Figure 2:
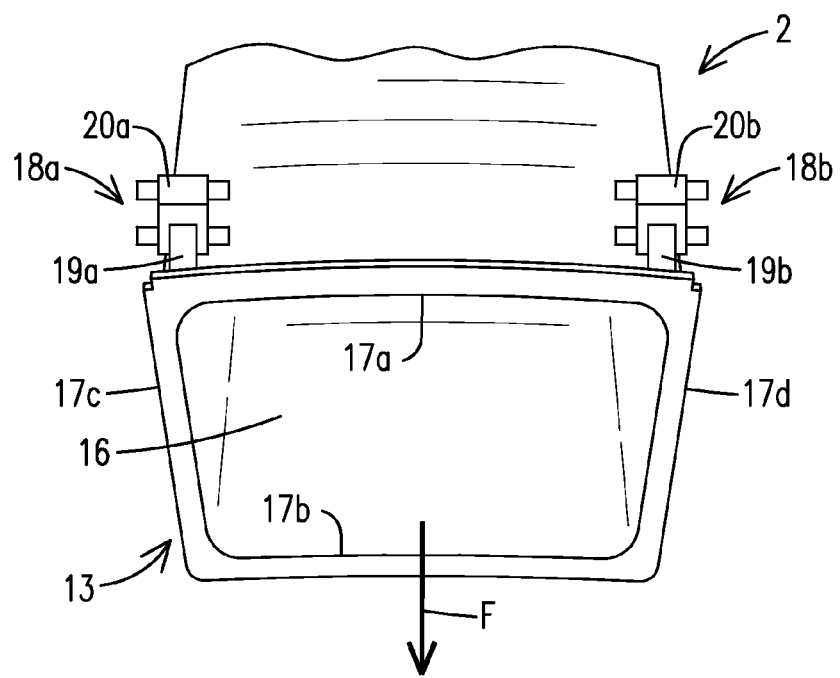
FIG. 2 illustrates an aft end view of a transition duct, in accordance with one embodiment.

FIG. 2 illustrates an aft end view of a transition duct, in accordance with one embodiment. The illustrated transition duct 2 has a transition aft frame 13 at its aft end, which comprises a four-sided body that defines a manifold 16 that opens into the turbine section 4. The four-sided body is formed by an outer panel 17a, an inner panel 17b and side panels 17c and 17d that connect the outer and inner panels 17a and 17b. With respect to the TVC 14, the outer and inner panels 17a, 17b are spaced apart in a radial direction, while the side panels 17c, 17d are spaced apart in a circumferential direction. This is clearly shown in the view of FIG. 3.

Unless otherwise specified, the terms "radial", "circumferential" and "axial" are meant to be understood with reference to the annular shaped stator component, i.e., the TVC 14 in the illustrated embodiments.

In accordance with the illustrated embodiments, the gas turbine engine 1 is provided with a can-annular configuration. In such a case the four-sided body may have, for example, a curvilinearly (or arc-like) trapezoidal shape, as shown in FIG. 2 The curvilinearly trapezoidal shape is characterized in that the side panels 17c, 17d oppose one another and are substantially straight. The outer and inner panels 17a, 17b extend between the side panels 17c, 17d and similarly oppose one another. The outer and inner panels 17a, 17b exhibit curvatures corresponding to the overall radial curvature of the can-annular configuration.

Figure 3:
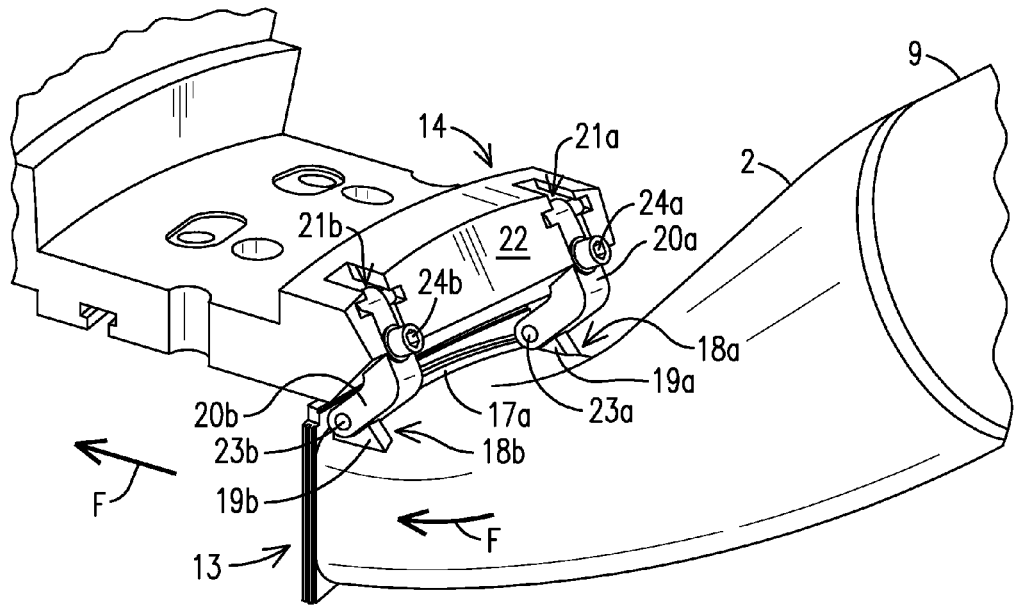
FIG. 3 illustrates a perspective top view of a transition duct assembled to a turbine vane carrier, in accordance with one embodiment.

The transition aft frame 13 is provided with a first attachment structure 18a and a second attachment structure 18b. The attachment structures 18a-b of the transition aft frame 13 are configured to be engaged with respective connection points 21a and 21b provided on a forward face 22 of the TVC 14 when the transition aft frame 13 is assembled axially to the TVC14, as shown in FIG. 3. The first and second attachment structures 18a-b are spaced apart. In shown example, the spacing is in a circumferential direction with respect to the TVC 14. The spacing between the attachment structures 18a-b is effective to transfer moment load from the first and second attachment structures 18, 18b to the side panels 17c, 17d respectively.

In the embodiment shown in FIG. 2, the first and second attachment structures 18a-b are disposed on the outer panel 17a. The attachment structures 18a-b may both be disposed offset from the midpoint of the outer panel 17a. The transfer of moment load to the side panels 17c-d increases with decreasing distance of the first and second structures 18a-b from the side panels 17c and 17d respectively. In one embodiment, the attachment structures 18a-b may be disposed directly over the respective side panels 17c-d or at least near the respective side panels 17c-d. By "near", it is meant that the first side panel 18a is disposed on the outer panel 17a at a distance from the side panel 17c which is less than 15% of the spacing between the side panels 17c and 17d. Likewise, the second side panel 18b is disposed on the outer panel 17a at a distance from the side panel 17d which is less than 10% of the spacing between the side panels 17c and 17d. Attachment structures 18a-b located near the side panels 17c-d of the transition duct 2 provides better radial support without imposing bending loads on the outer panel 17a. Wide based attachment structures prevent rotation about the transition duct axis.

FIG. 3 illustrates a perspective top view of a transition duct 2 assembled to a TVC 14, in accordance with one embodiment. In this embodiment, each of the attachment structures 18a-b comprises a respective link 20a-b, which is pivoted to respective lugs 19a-b provided on the outer panel 17a, by way of respective pins 23a-b. The links 20a-b are engaged to connection points 21a-b on the forward face 22 of the TVC 14, and may be secured thereto by respective bolts 24a-b. The pins 23a-b allow rotation of the respective links 20a-b about a tangential axis with respect to the annular TVC 14.

Figure 4:
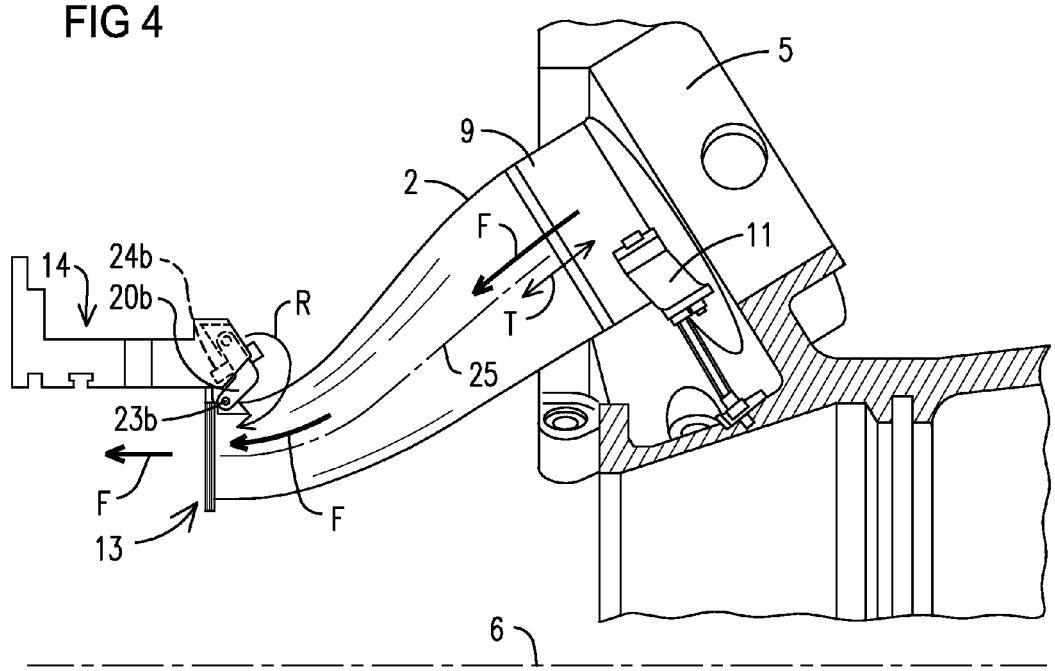
FIG. 4 illustrates a perspective side view of an assembled transition duct, in accordance with one embodiment.

FIG. 4 illustrates a perspective side view of an assembled transition duct 2, in accordance with one embodiment. At the forward end, the transition duct 2 comprises an inlet ring 9 which is connected to the case of the combustor 5 by way of a forward mount 11. The forward mount 11 allows translation along the transition duct axis 25, as indicated by double headed arrow T. At the aft end, the transition duct 2 comprises a transition aft frame 13 which engages with the TVC 14 of the turbine section in a manner described above. The pins 23a-b allow free rotation of the links 20a-b about a tangential axis, as indicated by the double-headed arrow R. The illustrated arrangement may thus provide fixed axial and radial constraint with free rotation at the aft end of the transition duct.

In the embodiments illustrated herein, the constraint set is revised with respect to the conventional transition aft mounts. The constraint set in the present embodiments is set to stiffen the aft mount in the axial direction. The transition duct is permitted to pivot about a tangential axis without generating bending moments at the aft end. Compliance in the forward mount allows thermal growth in the transition duct.

FIG. 5-9 illustrate, in a top perspective view, an approach sequence of a transition duct 2 for assembly with a TVC 14, according to an example embodiment. As shown in this embodiment, each of the links 20a-b is L-shaped (i.e., having a 90° bend). The exact shape of the links is however non-limiting with respect to the inventive concept. At an aft end of the links 20a-b, a respective pin 26a-b is provided, aligned in a tangential direction with respect to the TVC 14. The connection points 21a-b on the forward face 22 of the TVC 14 comprise respective slots 27a-b, that are correspondingly shaped to receive the respective links 20a-b. In this example, each slot 27a-b has the shape of a cross, to accommodate the pins 26a-b at the aft end of the links 20a-b.

Figure 5:
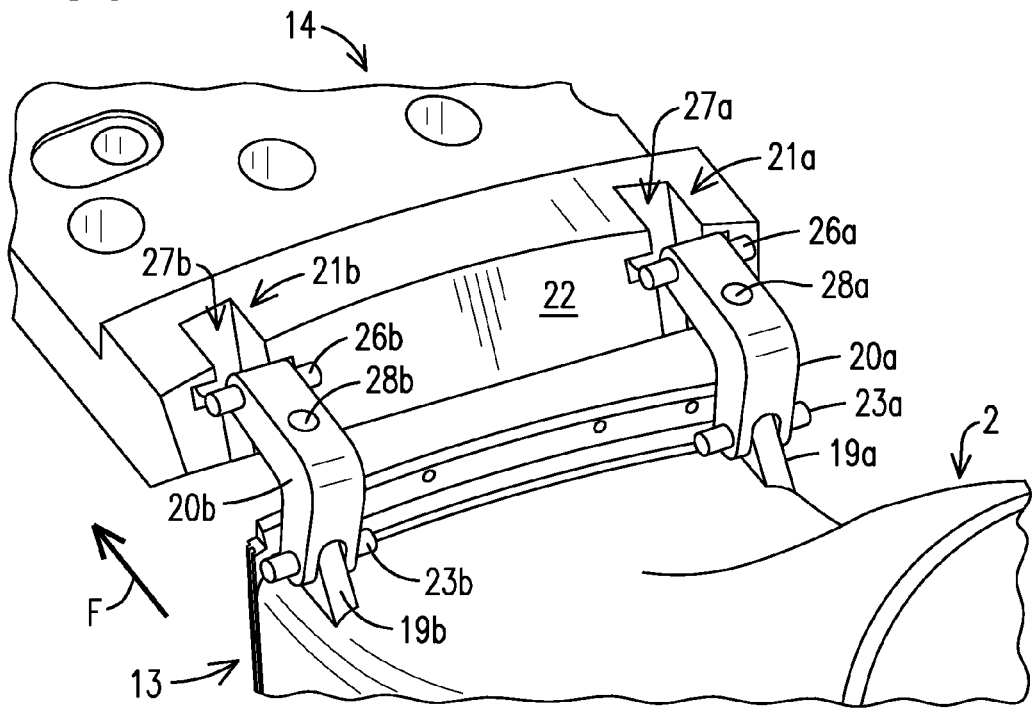
FIG. 5-9 illustrate, in a top perspective view, an approach sequence of a transition duct for assembly with a turbine vane carrier, according to an example embodiment.
Figure 6:
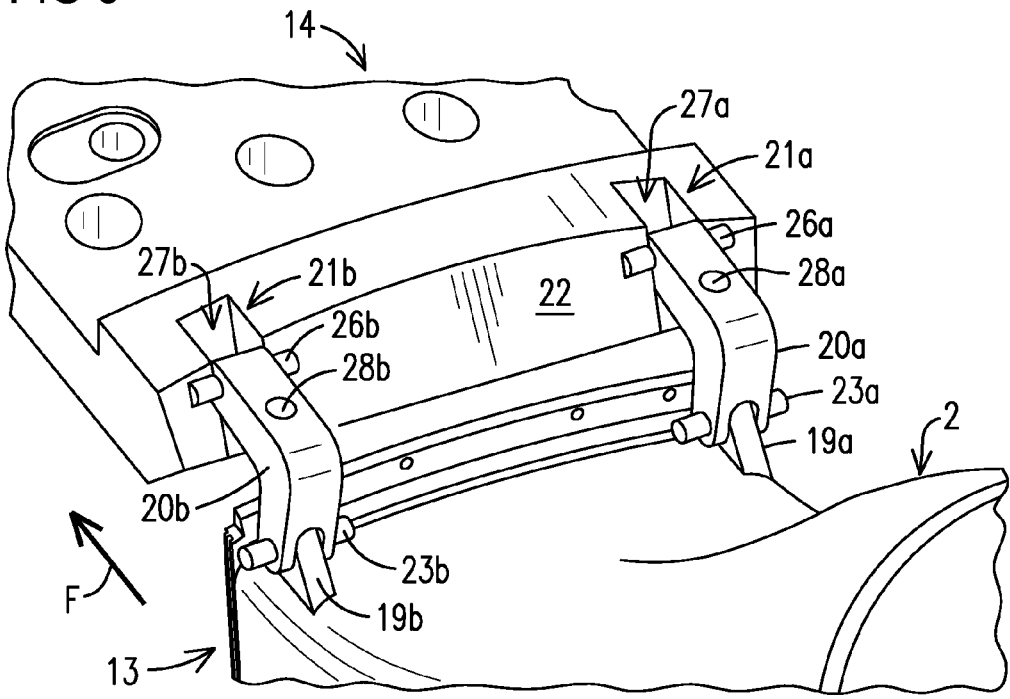
Figure 7:
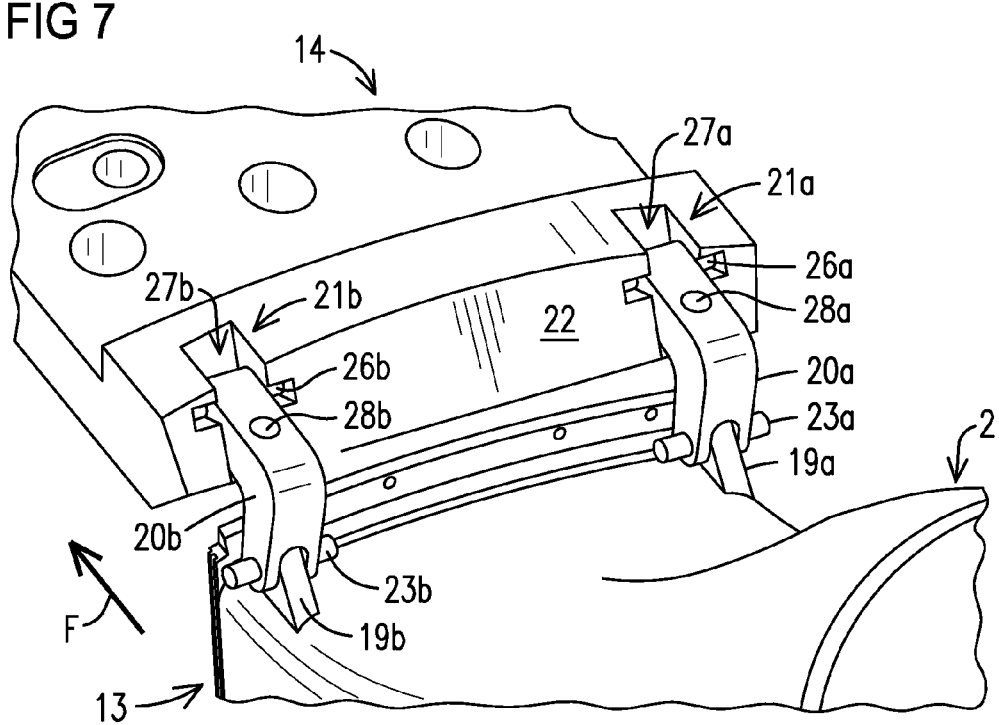
Figure 8:
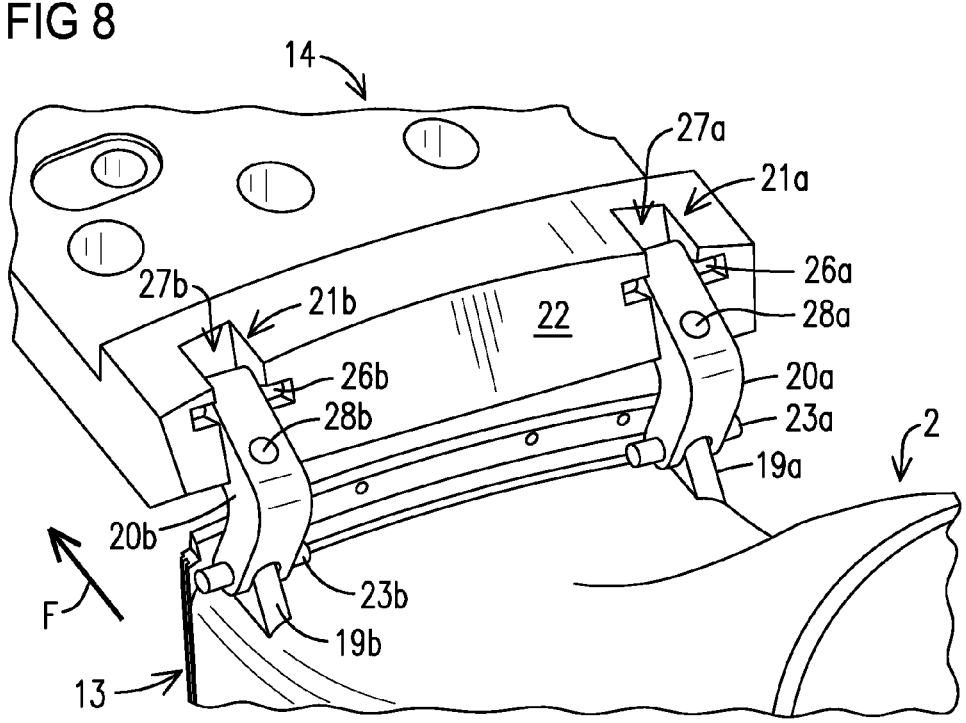
Figure 9:
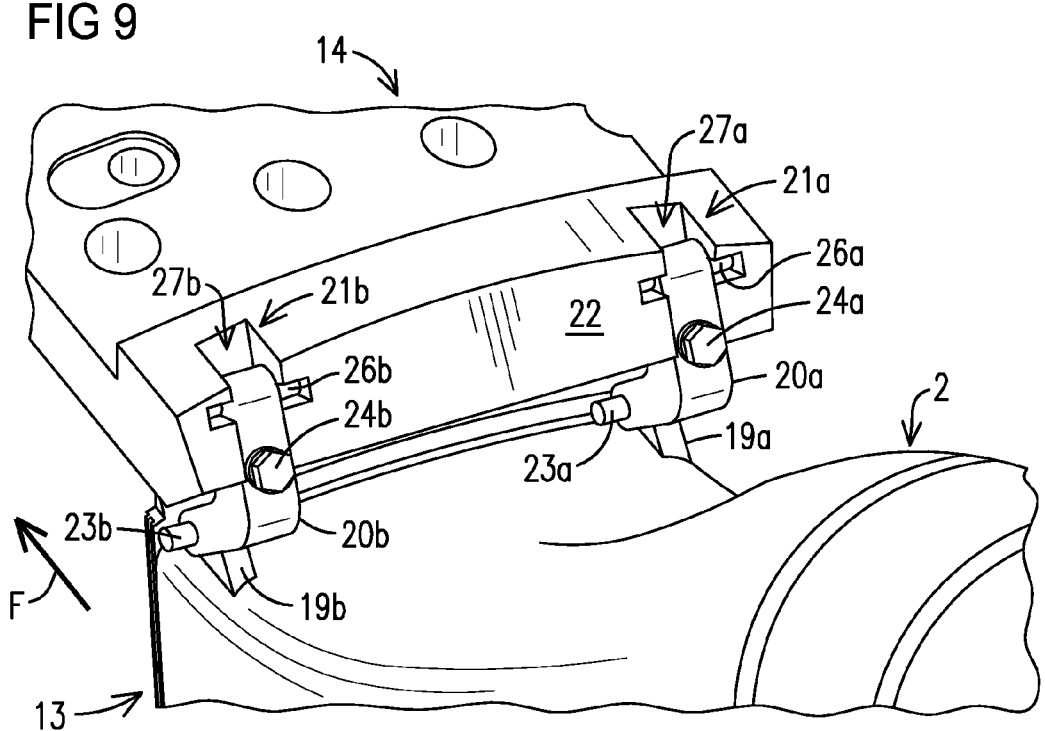

In the illustrated approach sequence, the transition duct 2 approaches the TVC 14 with the links 20a-b rotated (about the forward end pins 23a-b) to aft position, as shown in FIG. 5. Subsequently, as shown in FIG. 6, the pins 26a-b at the aft end of the links 20a-b engage in the respective slots 27a-b on the forward face 22 of the TVC 14. As shown in FIG. 7, engagement of the pins 26a-b in the slots 27a-b continues until the pins 26a-b reach the end of the respective slots 27a-b. After the engagement of the pins 26a-b to slots 27a-b, the links 20a-b begin to rotate about the tangential axis defined by center of the pins 23a-b, as depicted in FIG. 8. Next, as shown in FIG. 9, the links 20a-b rotate about the center of the pins 23a-b until the respective link face mates with the floor of the respective slots 27a-b, such that a bolt hole 28a-b on the respective link 20a-b aligns with a corresponding bolt hole (not visible) on the floor of the respective slot 27a-b. Bolts 24a-b are inserted through the aligned bolt holes on the links 20a-b and the slots 27a-b, to tightly secure the links transition aft frame 13 to the TVC 14.

Figure 10:
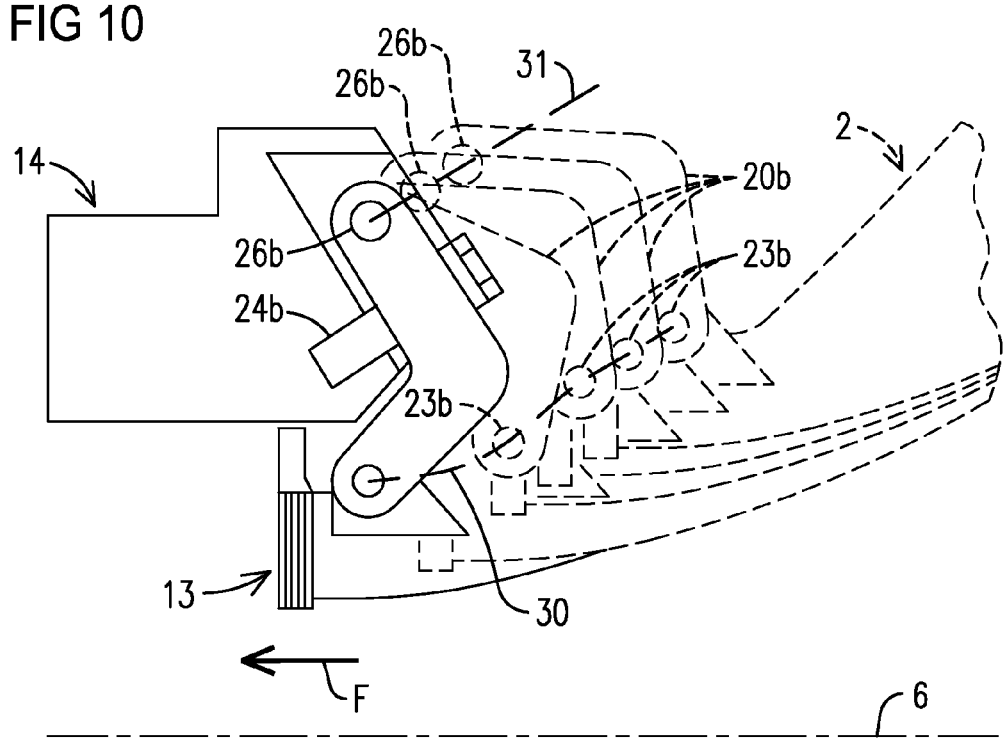
FIG. 10 illustrates a side view illustrating a locus of the transition aft frame in the approach sequence of FIG. 5-9.

The illustrated assembly sequence thus transitions from an inclined approach, till the point at which the pins 26a-b engage in the slots 27a-ab (FIG. 7). Thereafter, an axial approach is facilitated by the rotation of the links 20a-b about the pins 23a-b. This is illustrated in FIG. 10, which shows a side view of the approach sequence. Herein, the dashed line 30 shows the locus of the pins 23a-b at the forward end of the links 20a-b, while the dashed line 31 shows the locus of the pins 26a-b at the aft end of the links 20a-b. As shown by the dashed line 30, the link rotation pins 23a-b guides the aft end of the transition duct 2 from an inclined approach to an axial approach. Such an approach sequence may assist compression of the aft seals disposed between adjacent transition ducts 2 in a can-annular arrangement as described herein. The dashed line 31 shows the approach sequence from the side, showing aft end pins 26a-b engaging in the open slots 27a-b on the forward face of the TVC 14.

Once assembled, the links 20a-b remains rotatable about a tangential axis defined by the pin centers of pins 23a-b. The bolted connection between the links 20a-b and the slots 27a-b on the forward face of the TVC 14 ensure a fixed radial and axial constraint. The transition duct 2 is thereby permitted to pivot about a tangential axis without generating bending moments at the aft end.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

What is claimed is:

1. An apparatus for supporting an aft portion of a transition duct in a gas turbine engine, comprising:
    an annular shaped stator component disposed in a turbine section of the gas turbine engine,
    a transition aft frame that engages with the stator component, the transition aft frame comprising a radially outer panel, a radially inner panel, and circumferentially spaced first and second side panels connecting the radially inner and radially outer panels,
    wherein a forward face of the stator component comprises a first connection point and a second connection point spaced apart in a circumferential direction, each of the connection points comprising a respective slot,
    wherein the transition aft frame comprises first and second attachment structures that respectively engage with the first and second connection points on the forward face of the stator component when the transition duct is aligned axially with the stator component, the first and second attachment structures being spaced apart, the spacing being effective to transfer moment load from the first and second attachment structures to the first and second side panels respectively,
    wherein each of the attachment structures comprises a link that is rotatable about a tangential axis, and
    wherein an aft end of the link comprises a tangential pin that is engageable with a corresponding one of said slots on the forward face of the stator component, the link being rotatable about the center of the pin upon engagement of the pin in the slot.

2. The apparatus according to claim 1, wherein the first and second attachment structures are disposed on the outer panel of the transition aft frame.

3. The apparatus according to claim 1, wherein the first and second attachment structures are arranged off-center with respect to the transition aft frame.

4. The apparatus according to claim 1, wherein the first and second attachment structures are arranged near the first and second side panels respectively.

5. The apparatus according to claim 1, wherein a forward end of the link is pivoted with respect to a respective lug provided on the outer panel.

6. The apparatus according to claim 1, wherein the link is engageable to a floor of the slot such that a first bolt hole on the link aligns with a second bolt hole on the floor of the slot, wherein the link is bolted to the slot via said bolt holes upon engagement of the link to the floor of the slot.

7. The apparatus according to claim 6, wherein the link is engageable to the floor of the slot by rotation of the link about the center of the pin.

8. The apparatus according to claim 1, wherein annular stator component is a turbine vane carrier.

9. A gas turbine engine, comprising:
a combustor section for producing a working medium by combustion of a mixture of fuel and an oxidant,
a turbine section located downstream of the combustor section for expanding the working medium,
a transition duct arranged fluidically between the combustor section and the turbine section, for directing the working medium from the combustor section to the turbine section, the transition duct having an aft portion that is attached to the turbine section of gas turbine engine, and
an apparatus according to claim 1 for supporting the aft portion of the transition duct.

10. A transition duct for a gas turbine engine, comprising:
a transition aft frame attachable to an annular shaped stator component of a turbine section of the gas turbine engine, the transition aft frame comprising a radially outer panel, a radially inner panel, and circumferentially spaced first and second side panels connecting the radially inner and radially outer panels,
wherein the transition aft frame comprises first and second attachment structures that are arranged circumferentially spaced apart,
wherein the first and second attachment structures are configured to align with corresponding connection points on a forward face of the stator component when the transition duct is assembled axially with the stator component, each of said connection points comprising a respective slot,
wherein the spacing between the first and second attachment structures is effective to transfer moment load from the first and second attachment structures to the first and second side panels respectively,
wherein each of the attachment structures comprises a link that is rotatable about a tangential axis, and
wherein an aft end of the link comprises a tangential pin that is engageable with a corresponding one of said slots on the forward face of the stator component, the link being rotatable about the center of the pin upon engagement of the pin in the slot.

11. A gas turbine engine comprising:
a combustor section for producing a working medium by combustion of a mixture of fuel and an oxidant,
a turbine section located downstream of the combustor section for expanding the working medium, wherein the turbine section comprises a stator component, and
a transition duct according to claim 10, the transition duct being attached to the stator component of the turbine section and arranged fluidically between the combustor section and the turbine section, for directing the working medium from the combustor section to the turbine section.

12. The gas turbine engine according to claim 10, wherein the stator component is a turbine vane carrier that carries a first row of stationary vanes.

13. A method for supporting an aft portion of a transition duct to a turbine section of a gas turbine engine, comprising:
engaging a transition aft frame with an annular shaped stator component disposed in the turbine section of the gas turbine engine,
wherein the transition aft frame comprises a radially outer panel, a radially inner panel, and circumferentially spaced first and second side panels connecting the radially inner and radially outer panels,
wherein said engagement comprises axially aligning the transition duct with the stator component, whereby a first and a second attachment structure of the transition aft frame mate with a first and a second connection point on a forward face of the stator component respectively,
wherein the first and second attachment structures are spaced apart in a circumferential direction, the spacing being effective to transfer moment load from the first and second attachment structures to the first and second side panels respectively,
wherein each of the attachment structures comprises a link that is rotatable about a tangential axis,
the method comprising engaging a tangential pin located at an aft end of the link to a correspondingly shaped slot provided on the respective connection point on the forward face of the stator component.

14. The method according to claim 13, further comprising:
engaging the link to a floor of the slot by rotation of the link about the center of the pin, such that a first bolt hole on the link aligns with a second bolt hole on the floor of the slot, and
bolting the link to the slot via said bolt holes upon engagement of the link to the floor of the slot.

15. A method for supporting an aft portion of a transition duct to a turbine section of a gas turbine engine, comprising:
engaging a transition aft frame with an annular shaped stator component disposed in the turbine section of the gas turbine engine, along an inclined approach with respect to an axis of the stator component,
wherein the transition aft frame comprises a radially outer panel, a radially inner panel, and circumferentially spaced first and second side panels connecting the radially inner and radially outer panels, wherein the first and second attachment structures are spaced apart in a circumferential direction, the spacing being effective to transfer moment load from the first and second attachment structures to the first and second side panels respectively
wherein upon engagement, a first and a second attachment structure of the transition aft frame mate with a first and a second connection point on a forward face of the stator component respectively,
subsequent to said engagement, rotating each of the first and second attachment structures relative to the transition duct and about a tangential axis at the respective connection point, to facilitate an axial approach of the transition aft frame toward the stator component.

16. The method according to claim 15, further comprising:
subsequent to said rotation, securely connecting the first and second attachment structures to the first and second connection points to ensure a fixed radial and axial constraint on the transition aft frame.

* * * * *